Nov. 11, 1958      J. SMISKO      2,859,985
FIRE PROTECTIVE SLEEVE FOR HOSE END FITTINGS
Filed Dec. 22, 1952
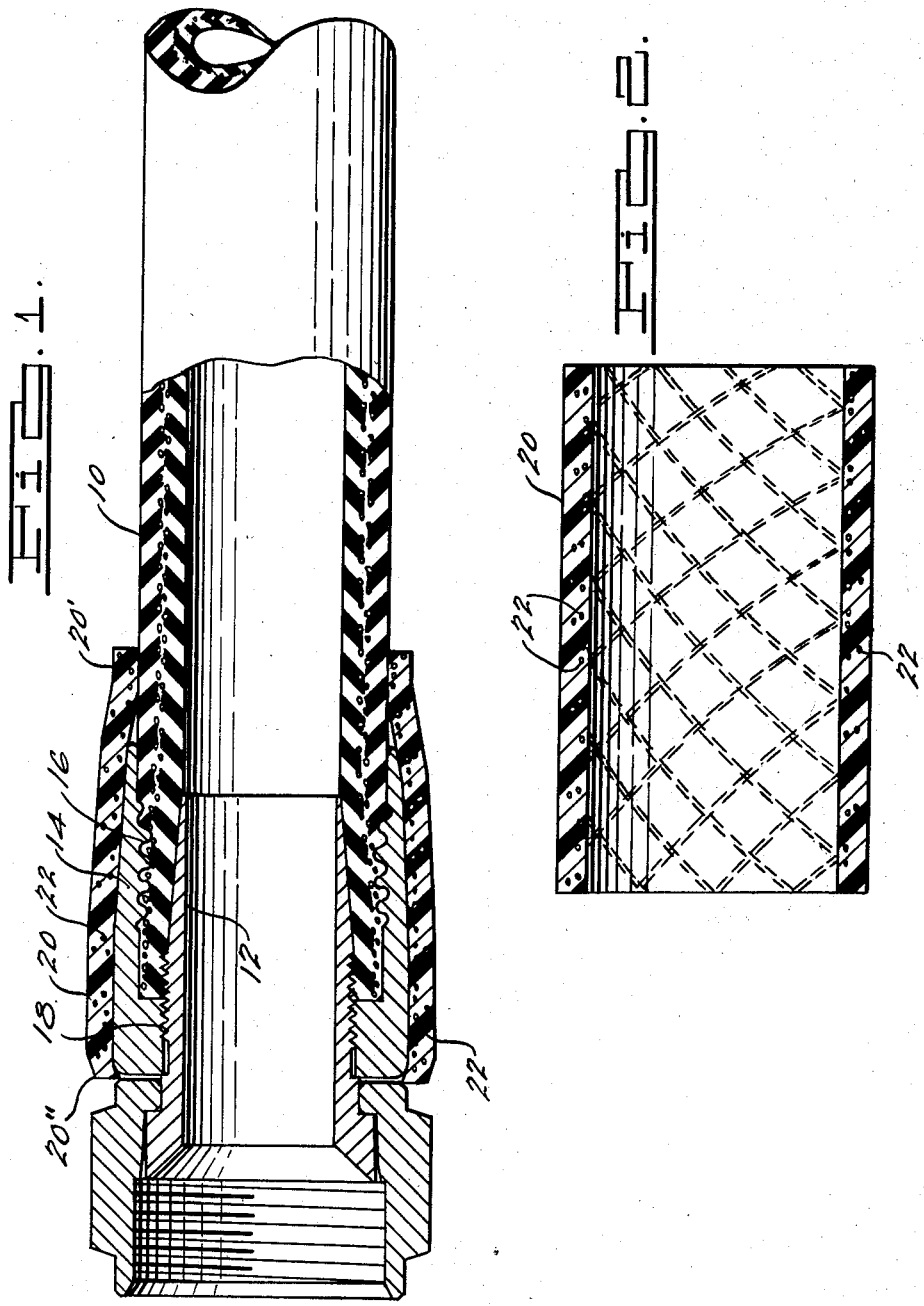
INVENTOR.
John Smisko.
BY
Norman N. Beaman
ATTORNEY.

United States Patent Office 2,859,985
Patented Nov. 11, 1958

2,859,985

FIRE PROTECTIVE SLEEVE FOR HOSE END FITTINGS

John Smisko, Jackson, Mich., assignor to Aeroquip Corporation, Jackson, Mich., a corporation of Michigan Application December 22, 1952, Serial No. 327,203

1 Claim. (Cl. 285—247)

This invention relates to flexible hose and end fitting assemblies and to improvements in the end fitting fire protective sleeve as disclosed in the prior U. S. Patent No. 2,487,554 granted November 8, 1949.

In the said prior patent the end fitting secured upon the end portion of a section of flexible hose is protected against the effect of fire by enclosing the outer metal socket within a protective sleeve of rubber-like material having asbestos fibres incorporated therein, the rubber-like material being described as including the synthetic rubber known under the registered trademark "Neoprene," which is an advantageous material to use since it does not support combustion and is a poor heat conductor.

Since this prior fire protective sleeve was devised, it has been necessary to devote considerable further investigation into the protecting of flexible hose and end fitting assemblies against the possible outbreak of fire, particularly in aircraft, and to insuring that the heat of the fire shall not affect the sealing of the hose end with respect to the hose end fitting, to the extent that leakage of the conducted fluid would occur at the end fitting, or the fitting might even be blown off the hose end due to the pressure of the conducted fluid.

In this connection it should be pointed out that if the metal socket of an end fitting secured upon the end of a hose line conducting high pressure fluid is allowed to be exposed to the heat of a fire, this will affect the rubber or rubber-like material of the hose sealed within the end fitting and cause the sealing action of this material to be also affected, such that leakage will occur. It was in order to prevent this from occurring that the said prior patent proposed to encase the end fitting socket in a sleeve of heat insulating material. However, with the continued use of the fire resisting sleeves of the prior patent it has now been realized that the ability of the sleeve to resist attack by fire, to the extent that the sleeve will remain in place even when subjected to the effect of excessive vibration, as encountered in practice, will be considerably increased if wire braid could be employed in place of the asbestos fibres proposed for use according to the said prior patent. A further desirable requirement is that the protective sleeve should be capable of being stretched into position upon a socket and made to closely hug the socket when in position. It might be pointed out here that the presently available flexible hose is itself sufficiently fire resistant but that the metal end fittings constitute, in effect, weak links in the hose line and detract from the fire resisting property thereof. The purpose of the sleeve fitting is to overcome this weak link and ensure that the hose line is uniformly fire resistant along its length.

By the present invention there is now provided a fire protective sleeve for the socket of an end fitting upon a flexible hose line in which the protective sleeve, of heat insulating material, is reinforced internally with wire braid, which replaces the asbestos fibres of the prior sleeve. This wire braid is so arranged in position within the material of the heat insulating material that the sleeve is capable of being expanded circumferentially and stretched into position over the socket of a hose end fitting so as to hug the socket as closely as possible.

It is thus an object of this invention to provide a fire protective sleeve for the end fitting socket of flexible hose which has improved fire resisting property and is able to withstand vibration so as to maintain its sleeve form even when the sleeve becomes charred by exposure to fire.

It is a further object of the invention to provide a wire reinforced fire protective sleeve for the socket of a hose end fitting which is capable of being stretched into position over the socket and closely hug the socket.

The above and further objects and advantages of the invention will appear clear from consideration of the following detail description of one practical embodiment of the invention with reference to the accompanying drawings and from the appended claim.

In the drawings,

Fig. 1 is a longitudinal section of a hose end fitting and hose assembly incorporating a fire protective sleeve in accordance with the invention, and Fig. 2 is a longitudinal section of the fire protective sleeve according to Fig. 1, prior to being stretched into position over the end fitting socket.

Referring to the drawings, 10 indicates a section of flexible hose and 12, 14 indicate, respectively, the inner nipple and outer socket of a metal end fitting secured upon an end portion 16 of a hose and serving to secure the hose 10 to another hose section, for example.

Flexible hose for conducting high pressure fluid, such as the fuel used on aircraft, lubricating oil, coolants or other hydraulic pressure fluid has been designed to withstand high internal pressure, as well as damage due to fire from without, to the extent that the hose is still able to conduct the fuel when damaged by exposure of the outer surface of the hose to fire. Such hose is normally reinforced by wire braid, which is applied to the hose material so as to hold the hose diameter constant and which also serves to protect an inner tube portion of the hose along which the pressure fluid is conducted. The wire fabric forms, in effect, a fire protective covering for the inner tube and gives the hose itself a fire resisting property.

The end fitting is secured upon the hose end portion 16 by this end portion being gripped between the nipple 12 and the socket 14. In the example illustrated the end fitting is of the re-usable compression type, in which the socket 14 is first secured over the outer surface of the hose 10 and then the nipple 12 is screwed through the screw-threaded end opening 18 in the socket and engaged with the inner tube portion of the hose, constituting the hose bore. The socket and nipple surfaces are formed so as to exert compression upon the hose, whereby to hold the hose end compressively sealed within the annular chamber formed between the socket and nipple surfaces, it being understood that the hose bore is constituted by rubber or rubber-like material. It is to be understood, however, that the invention is applicable to other types of end fittings presently available and employed for the purpose in question. Whichever type of end fitting is employed, the problem arises of maintaining the hose sealed with respect to the end fitting in the event that the hose and end fitting assembly should be exposed to a fire, involving temperatures in the order of 1800–2000° F.

Considering the assembly without the outer fire protective sleeve 20, it follows that if the metal of the socket 14 is exposed to such heat it will affect the hose material to the extent that it loses its inherent elasticity, with the result that the hose is no longer held sealed against the nipple 12 and the end fitting becomes loosened upon the hose, or it is even blown off, it being realized that internal fluid pressures up to 3000 lbs. p. s. i. are involved. It is to prevent this from happening that the sleeve 20 is provided and fitted over the socket 14. This sleeve is made from a suitable heat insulating material, preferably comprising a rubber-like material and, advantageously, the synthetic rubber material known under the registered trademark "Neoprene." This material does not support combustion and is a poor heat conductor. However, when subjected to heating by a flame the material assumes a charred condition and it becomes necessary, therefore, to hold the sleeve 20 in position and prevent it from disintegrating if the sleeve is to remain effective during the time the fire is being extinguished. In this connection, a time period of from 10 to 20 minutes might be involved and during this time the sleeve will be subjected to continuous vibration, present in these hose and end fitting assemblies in use. The sleeve 20 is, accordingly, reinforced with wire braid 22 which is sufficient to hold the sleeve against disintegration and which is also so wound into position in the material of the sleeve, by suitable selection of the braid angle, that the sleeve is capable of being expanded in diameter to enable the sleeve to be stretched into position over the socket 14. Such a braid angle is seen in Fig. 2.

It has been proven that a sleeve of "Neoprene" (registered trademark) incorporating a wire braid composed of two wire strands, as indicated in the drawings, satisfactorily fulfills the object of this invention, although it is not intended that the invention be regarded as limited to the use of two wire strands to form the wire braid. Unlike the wire braid reinforcement employed in high pressure flexible hose, however, which is wound at an angle so that the hose diameter is maintained constant, the wire braid in the sleeve 20 is wound, as above stated, so that it permits the sleeve to be expanded in diameter.

The sleeve 20, in its initial state, as seen in Fig. 2, is longer than the socket 14, and is of such length that when stretched over the socket an end portion 20' of the sleeve will contract onto, and enclose, a portion of the hose 10 adjacent one end of the socket, while the other end portion 20" will contract over the opposite end of the socket. The entire construction and arrangement of the sleeve is such that it is capable of being stretched over the socket so as closely to hug the same, with its end portions 20', 20" also closely hugging the hose and socket end, respectively.

Having thus described my invention, what I claim as novel and wish to protect by Letters Patent is:

In combination with a coupling for flexible hose having relatively low fire resisting properties wherein the hose is securely clamped between a socket and nipple constituting the coupling, of means for reducing fire hazards due to overheating of the metal of the coupling comprising a sleeve of rubber-like material having open wire braid reinforcement embedded therein completely surrounding and tightly fitting the metal portion of the coupling, the ends of said sleeve being contracted over the ends of the coupling to completely enclose the metal of the coupling and the braids of said reinforcement being spaced sufficiently to permit the sleeve to be expanded over said coupling, said wire braid reinforcement being located within the exterior and interior surfaces of said sleeve and holding the sleeve intact against the effects of vibration even if the rubber-like material of the sleeve has become charred due to overheating.

References Cited in the file of this patent

UNITED STATES PATENTS

| | | |
|---|---|---|
| 1,709,893 | Bemis | Apr. 23, 1929 |
| 2,189,987 | Kellems | Feb. 13, 1940 |
| 2,445,231 | McDermott | July 13, 1948 |
| 2,487,554 | Hurst | Nov. 8, 1949 |